(12) United States Patent
Chino

(10) Patent No.: US 7,277,845 B2
(45) Date of Patent: Oct. 2, 2007

(54) COMMUNICATION SUPPORT APPARATUS AND METHOD

(75) Inventor: Tetsuro Chino, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 838 days.

(21) Appl. No.: 10/294,819

(22) Filed: Nov. 15, 2002

(65) Prior Publication Data

US 2003/0097250 A1    May 22, 2003

(30) Foreign Application Priority Data

Nov. 22, 2001    (JP)    ............................ P2001-357949

(51) Int. Cl.
G06F 17/28    (2006.01)
(52) U.S. Cl. ........................................................ 704/2
(58) Field of Classification Search ...................... None
See application file for complete search history.

(56) References Cited

U.S. PATENT DOCUMENTS

| | | | | |
|---|---|---|---|---|
| 5,526,268 A | * | 6/1996 | Tkacs et al. ................... | 704/8 |
| 5,583,761 A | * | 12/1996 | Chou ............................. | 704/2 |
| 5,987,403 A | * | 11/1999 | Sugimura ...................... | 704/2 |
| 6,167,366 A | * | 12/2000 | Johnson ......................... | 704/2 |

FOREIGN PATENT DOCUMENTS

| | | |
|---|---|---|
| JP | 62-044873 | 2/1987 |
| JP | 05-197507 | 8/1993 |
| JP | 08-137385 | 5/1996 |
| JP | 11-110387 | 4/1999 |
| JP | 2000-137710 | 5/2000 |
| JP | 3131432 | 11/2000 |
| JP | 3167799 | 3/2001 |

OTHER PUBLICATIONS

Jain et al., "Structure in On-line Documents," IEEE (Sep. 2001), pp. 844-848.
Nagata et al., "Two-Channel Adaptive Microphone Array with Target Tracking," Journal of IECE (Jun. 1999), J82-A:860-866.
ascii24.com, http://ascii24.com/news/i/soft/article/1998/04/06/602131 (Apr. 1998).
Dolby News-Jan. 1997 "Surroundings" Newsletter (Jan. 1997), pp. 1-5.
Satoh et al., "Recognition of rotated patterns using neocognitron" (1997).
Machii et al., "A Method for On-line Text/Drawings Segmentation of Stroke Patterns," IPSJ Journal (Apr. 1996), 37:490-499.

* cited by examiner

*Primary Examiner*—Abul K. Azad
(74) *Attorney, Agent, or Firm*—Finnegan, Henderson, Farabow, Garrett & Dunner, L.L.P.

(57) ABSTRACT

An input unit inputs a drawing information based on a first language on a display by at least one of a plurality of users each locating at predetermined position relative to the display. A conversion unit converts the drawing information based on the first language to an information based on a second language. A control unit presents the information based on the second language on the display according to a location of another user of the plurality of users as a person to present the information based on the second language.

17 Claims, 10 Drawing Sheets

| ID | POSITION | ORIENTATION | KIND | LOCUS | TRANSLATION ID | CONTENTS |
|---|---|---|---|---|---|---|
| : | : | : | : | : | : | : |
| I 1 | L 1 | — | FIGURE | T 1 | — | — (DRAWING OF A RIVER) |
| I 2 | L 2 | — | FIGURE | T 2 | — | — (DRAWING OF A HOUSE) |
| : | : | : | : | : | : | : |
| I 3 | L 3 | V 3 | JAPANESE | T 3 | I 4 | 家 |
| I 4 | L 4 | V 2 | ENGLISH | — | I 3 | HOME |
| : | : | : | : | : | : | : |
| I 5 | L 5 | — | FIGURE | T 5 | — | — (DRAWING OF A BRIDGE) |
| : | : | : | : | : | : | : |
| I 6 | L 6 | V 6 | ENGLISH | T 6 | I 7 | Bridge |
| I 7 | L 7 | V 1 | JAPANESE | — | I 6 | 橋 |
| : | : | : | : | : | : | : |
| I 8 | L 8 | V 8 | JAPANESE SYMBOL | T 8 | I 9 | 〒 |
| I 9 | L 9 | V 2 | ENGLISH | — | I 8 | Post Office |
| : | : | : | : | : | : | : |

| USER ID | LOCATION | UPRIGHT ORIENTATION |
|---------|----------|---------------------|
| ⋮ | ⋮ | ⋮ |
| USER J | P 1 | V 1 |
| USER E | P 2 | V 2 |
| ⋮ | ⋮ | ⋮ |

COMMUNICATION SUPPORT APPARATUS AND METHOD

CROSS-REFERENCE TO RELATED APPLICATIONS

This application is based upon and claims the benefit of priority from the prior Japanese Patent Application PH2001-357949, filed on Nov. 22, 2001; the entire contents of which are incorporated herein by reference.

FIELD OF THE INVENTION

The present invention relates to a communication support apparatus and a method for translating language information used among a plurality of users and for effectively presenting a translation result to a partner in the plurality of users.

BACKGROUND OF THE INVENTION

In recent years, the opportunity for ordinary persons who go abroad is increasing, and the number of people who live in a foreign country is also increasing. Furthermore, a progress of communication technology or computer networking technology such as an Internet is also remarkable. Therefore, since an opportunity to communicate in a foreign language and an opportunity to interact with a foreigner has increased, a need for exchange between different cultures or between different languages has been increasing. This is an inevitable flow because the world is becoming borderless, and it is thought that this tendency continues to be accelerated.

For the purpose of exchange messages cut across different languages or between different cultures, the necessity of communication in different languages for persons whose native languages are different, or the necessity of communication between different cultures for persons whose cultural background are different, are increasing.

As a method for communicating with one person who speaks a different language from another person's native language, one person can learn another person's native language, or use a translator who can mutually translates between a plurality of languages, can be considered.

However, learning a foreign language is not easy for anyone, and requires great time and costs. Furthermore, even if a particular person can master one foreign language, his partner may not be able to use the language which the particular person has mastered. In this case, it is necessary for the particular person to master a second or third foreign language, and the resulting difficulty of language learning increases.

Moreover, since the translator is a professional with special skill, the number of the translators is also limited, and the employment costs are also high. As a result, generally it is seldom used.

When ordinary people travel abroad, they often use a book with conversation phrases normally encountered with its translation. In this book, various kinds of expressions of fixed form phrase for communication are recorded.

However, since the number of conversation phrases in the book is restricted, all expressions needed in an actual conversation cannot be covered, and the collection of conversation phrases is inadequate. Moreover, it is very difficult for a user to memorize the fixed form phrase recorded in the collection of conversation phrases in the same way of learning of foreign language. Since the collection of conversation phrases is a form of the book, it is difficult for a user to quickly discover the page in which a necessary expression is described in the scene of an actual conversation. Therefore, in the actual communication, it is not necessarily effective.

Alternatively, an electronic translator as a portable size in which the collection of conversation phrases is electronically maintained may be used. A user may use the electronic translator by hand and specifies a sentence to be translated by a keyboard or a menu selection operation. The electronic translator changes an input sentence into a foreign country language, and outputs the translated sentence through a display or a loudspeaker. In this way, communication with a partner who speaks a different language is performed.

In the electronic translator, the time and effort to retrieve conversation phrases necessary for a user is minimally reduced when compared with the book (collection of conversation phrases). However, in the same way of the book, the electronic translator stores the limited fixed form phrases and some extended expressions which are partially transformed only from the fixed form phrases. In short, sufficient communication between persons each of which native foreign language is different cannot be enabled.

Moreover, if the number of conversation phrases of the electronic translator increases, the user's operation of the electronic translator is executed by a keyboard and a menu selection. As a result, it is difficult for the user to select a sentence to be translated. In short, validity in actual communication falls.

Thus, in the prior art, it is a problem that there are no tools to sufficiently support communication among a plurality of persons whose use languages are different.

SUMMARY OF THE INVENTION

It is an object of the present invention to provide a communication support apparatus and a method of enabling smooth communication among a plurality of persons whose use languages are different.

According to the present invention, there is provided a communication support apparatus, comprising: an input unit configured to input a drawing information based on a first language for presentation on a display by at least one of a plurality of users each locating at predetermined position for the display; a conversion unit configured to convert the drawing information based on the first language to an information based on a second language; and a control unit configured to present the information based on the second language on the display according to a location of another user of the plurality of users as a person to present the information based on the second language.

Further in accordance with the present invention, there is also provided a communication support apparatus, comprising: an input unit configured to receive an input message based on a first language from a user; a translation unit configured to translate the input message into an output message based on a second language for another user; and a presentation unit configured to present the output message allocated towards a location of another user.

Further in accordance with the present invention, there is also provided a method for supporting communication, comprising: inputting a drawing information based on a first language for presentation on a display by at least one of a plurality of users each locating at predetermined position for the display; converting the drawing information based on the first language to an information based on a second language; and presenting the drawing information based on the second language on the display according to a location of another user of the plurality of users as a person to present the information based on the second language.

Further in accordance with the present invention, there is also provided a method for supporting communication, comprising: receiving an input message based on a first language from a user; translating the input message into an output message based on a second language for another user; and presenting the output message allocated towards a location of another user.

Further in accordance with the present invention, there is also provided a computer program product, comprising: a computer readable program code embodied in said product for causing a computer to support communication, said computer readable program code having: a first program code to input a drawing information based on a first language for presentation on a display by at least one of a plurality of users each locating at predetermined position for the display;

a second program code to convert the drawing information based on the first language to an information based on a second language; and a third program code to present the drawing information based on the second language on the display according to a location of another user of the plurality of users as a person to present the information based on the second language.

Further in accordance with the present invention, there is also provided a computer program product, comprising: a computer readable program code embodied in said product for causing a computer to support communication, said computer readable program code having: a first program code to receive an input message based on a first language from a user; a second program code to translate the input message into an output message based on a second language for another user; and a third program code to present the output message allocated towards a location of another user.

BRIEF DESCRIPTION OF THE DRAWINGS

FIG. 2 is a schematic diagram showing an example of the contents of a display information memory 16 in FIG. 1 in an embodiment of the present invention.

FIG. 5 is a schematic diagram showing an example of the contents of a location information memory 17 in FIG. 1 in an embodiment of the present invention.

DETAILED DESCRIPTION OF THE EMBODIMENT

Figure 1:
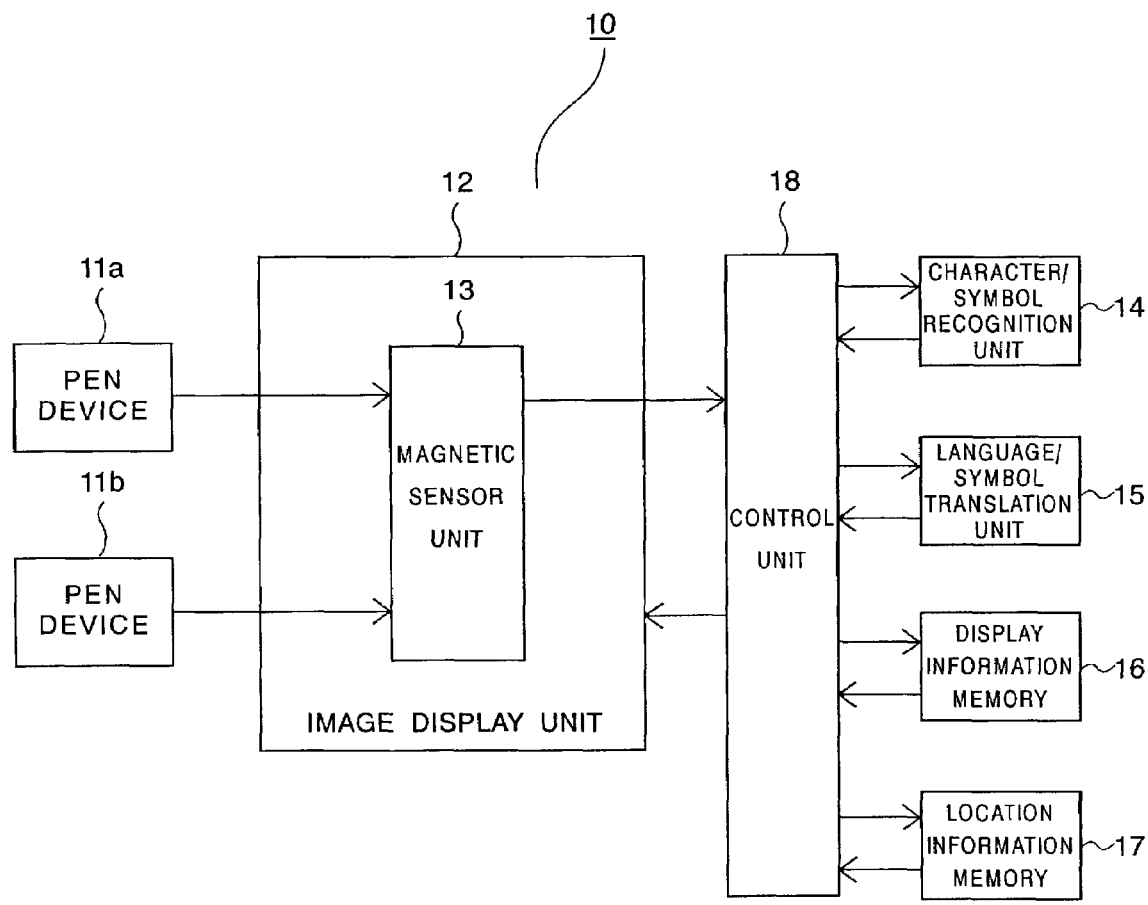
FIG. 1 is a block diagram showing the communication support apparatus according to the first embodiment of the present invention.

Hereafter, various embodiments of the present invention will be explained by referring to the drawings.

FIG. 1 is a block diagram showing the communication support apparatus according to the first embodiment of the present invention.

In embodiments of the present invention, in view of the development of speech recognition techniques and automatic recognition techniques of handwritten characters, and a background of improvement of speed and precision of natural language processing techniques, such as a machine translation for a text, communication between different languages can be smoothly executed using above-mentioned technique.

In short, in embodiments of the present invention, after receiving an input message from a user, the input message is translated so that another user to whom the input message is provided can understand the input message. A presentation orientation of a translation message is determined according to the user's location. As a result, communication among a plurality of users whose use languages are different can be effectively supported.

When communicating with a foreigner who speaks a foreign country language, a conversation of writing, which is conversation with a partner by writing a figure and a character using a pen, a pencil, or a memo pad, is often used. In this method, by displaying a picture or an image in handwriting, an effective communication with a partner can be performed. However, it may be difficult to communicate with the partner only by the picture or the image to tell things except for expressive concrete things. Additionally, since the cultural backgrounds of the people on both sides (a particular person and a partner) to communicate are different, a symbol or a figure depending on a language or a culture may not necessarily be effective.

Moreover, for example, like Japanese and Chinese, even though both languages use the common alphabet (character) called the kanji, the kind (form) of kanji actually used is different. Therefore, the conversation of writing is not necessarily an effective communication means.

Accordingly, in the first embodiment of the present invention, a handwriting input is enabled in consideration of the validity of the conversation of writing. That is, after handwriting text is translated, the translated text is presented according to orientation (direction) based on the partner's location though a display or a loudspeaker. Moreover, in this case, various kinds of symbols are converted (translated) according to the language and culture of the partner's native country. In this way, effective communication is enabled.

In FIG. 1, the communication support apparatus 10 comprises at least one pen device 11, an image display unit 12, a magnetic sensor unit 13, a character/symbol recognition unit 14, a language/symbol translation unit 15, a display information memory 16, a location information memory 17, and a control unit 18.

A pen device 11 (11a, 11b, - - - ) outputs a magnetic signal containing a peculiar identification signal from a nib for each device. The magnetic sensor unit 13 is set on the image display unit 12. By the user's holding pen device 11 by hand and tracing on the image display unit 12 with a nib of the pen device, image information such as characters, symbols and figures can be input by handwriting.

The image display unit 12 is consisted of, for example, a liquid crystal display (LCD), and suitably presents a character, a symbol and a figure according to an indication of the control unit 18 mentioned later.

By receiving and analyzing the magnetic signal emitted from each pen device 11, the magnetic sensor unit 13 acquires information such as a spatial position and a locus (movement) of each pen device 11, and information about a state of contact on a main part or a posture of the pen device 11. The magnetic sensor unit 13 outputs this pen input information to the control unit 18.

In the first embodiment of the present invention, the control unit 18 can detect a relative location relation between a user using the pen device 11 and the apparatus 10 (the image display unit 12) by referring to the pen input information.

By analyzing the pen input information supplied from the control unit 18, the character/symbol recognition unit 14 carries out separation extraction of a character, a symbol, a figure and a drawn image by handwriting input; acquires information about the locus of a nib, the kind, the contents and a position or an orientation as recognition result information; and outputs it to the control unit 18. In addition, the recognition processing of the handwriting input by the pen device is disclosed in Japanese patent No. 3167799.

In the first embodiment, the control unit 18 detects orientation (direction) of a character/symbol input as the recognition result from the character/symbol recognition unit 14, and detects a relative location between the user who input the character/symbol as the recognition object by handwriting and apparatus 10 (image display unit 12). Moreover, the control unit 18 detects whether the character/symbol is equivalent to which language, and detects a relative location relation between the user who input the character/symbol corresponding to the detected language and the apparatus 10 (image display unit 12).

Moreover, the control unit 18 can also decide the user who performed a handwriting input by analyzing the handwritten input (by analyzing the information about the handwriting locus and pressure at the time of the handwriting input, or the feature of the input image). Concretely, the relative location relation between the user and the apparatus 10 (the image display unit 12) or the language kind used by the user can be decided.

The language/symbol translation unit 15 extracts language information or a symbol peculiar to the language kind (culture) from the recognition result information supplied from the control unit 18, translates the extracted information by a target language, and outputs the translation result information to the control unit 18. In addition, the translation processing of language information is disclosed in Japanese patent No. 3131432.

The control unit 18 acquires various kinds of display information based on the pen input information, the recognition result information; and the translation result information. The control unit 18 classifies the various kinds of display information suitably, and saves it in the display information memory 16.

FIG. 2 is a schematic diagram showing an example of the contents of the display information memory 16 in FIG. 1. As shown in FIG. 2, the control unit 18 classifies the input information into ID (identifier) information, position information, orientation information, kind information, locus information, translation ID information and contents information, and stores them in the display information memory 16.

As for each entry of the display information memory 16 of FIG. 2, an identification number of each entry is recorded in a column of the ID information.

Figures 3, 4:
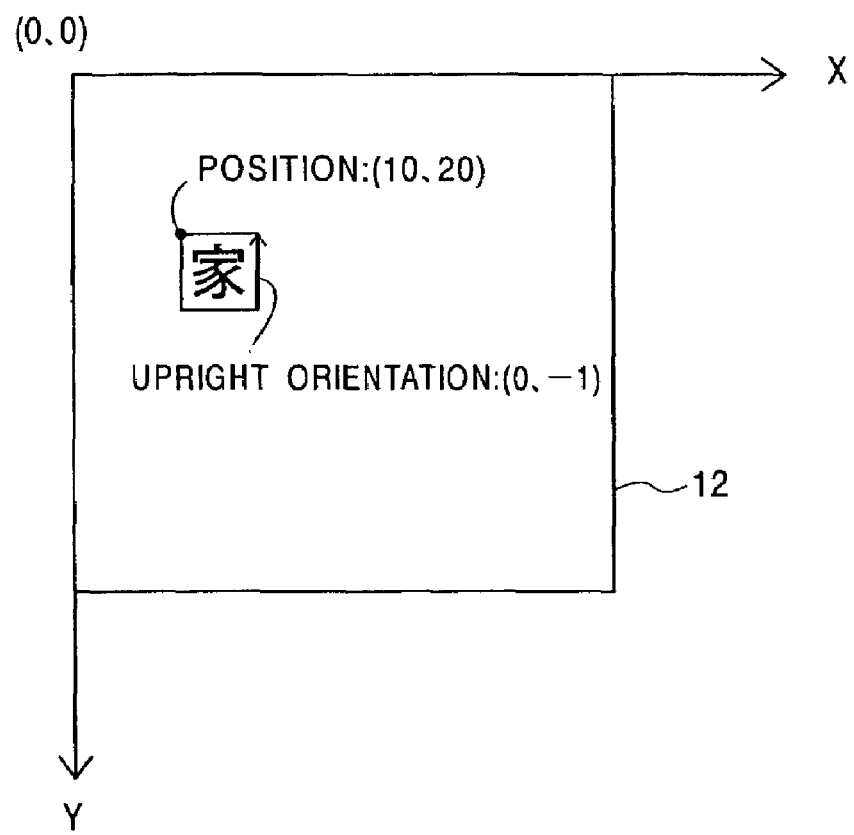
FIG. 3 is a schematic diagram showing a position and an upright orientation of a character drawn on a display screen in an embodiment of the present invention.
FIG. 4 is a schematic diagram showing an example of a Japanese character drawn on the display screen in an embodiment of the present invention.

In a position information column, the position of the area of each display information on the image display unit 12 is recorded as a coordinate based on the coordinate axis of the image display unit 12. As shown in FIG. 3, a screen position on the image display unit 12 is represented as (X, Y) which is a pair of coordinates, including a coordinate value along an X-axis extended rightward and a coordinate value along a Y-axis extended down by making the upper left corner into the origin. For example, a value L3 of the position information in the entry of a value I3 of the ID information in FIG. 2 is specifically described in FIG. 3. In the example of FIGS. 2 and 3, the input corresponding to this entry of I3 is a Japanese character shown in FIG. 4. This input is displayed on the position of the coordinates (10, 20) on the display screen.

In an orientation information column, the orientation of each display information is recorded by a vector expression based on the coordinate axes on the display screen. In addition, a sign "–" is recorded for the display information without the orientation.

In a kind information column, the kind of each display information is recorded; such as a "figure", "Japanese", "English", a "Japanese symbol", and an "English symbol."

In a locus information column, the input drawing locus corresponding to each display information acquired from the pen input is recorded. In addition, in the entry corresponding to the translation result obtained by the language/symbol translation unit 15, since the locus information does not exist, the sign "–" is recorded.

Moreover, in a column of the translation ID information, ID of entry of the display information which corresponds as a translation pair is recorded. In addition, a sign "–" is recorded in the entry in which the translation pair does not exist.

In a contents information column, information to be displayed on the image display unit 12 is recorded. In addition, in the case of a figure, a sign "–" is recorded in this column. This shows that the locus information should be displayed as it is.

In FIG. 1, the location information memory 17 stores information about the spatial location of each user based on a location of the apparatus 10 (image display unit 12).

FIG. 5 is a schematic diagram showing one example of the contents of the location information memory 17 in FIG. 1. As shown in FIG. 5, information of the user's location is classified into user ID information, location information; and upright orientation information, and is stored in the location information memory 17. As for each entry of the location information memory 17, in a user ID information column, a sign for identifying each user is recorded.

Figure 6:
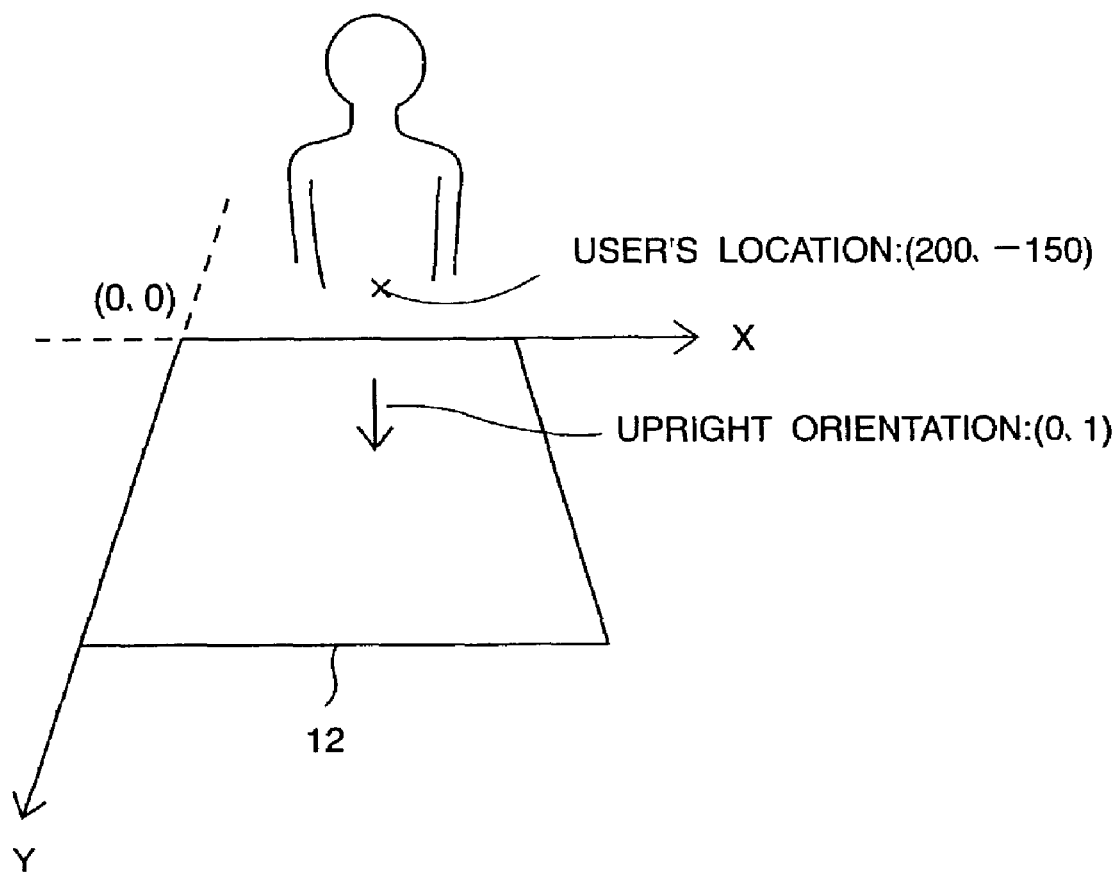
FIG. 6 is a schematic diagram showing a location and an upright orientation of a user for the display screen in an embodiment of the present invention.

In a location information column, the spatial location relation between the corresponding user and the apparatus 10 is recorded according to the coordinate system on a screen of the image display unit 12 of the apparatus 10. That is, the relative location of the user for the apparatus 10 is represented by the coordinate axes (having an X-axis and a Y-axis adopted as the coordinate system on a screen of the image display unit 12) respectively extrapolated along both "+" and "–", directions. For example, when the value of the location information P1 of the entry of which user ID is "USER J" in FIG. 5 is (200, −150), as shown in FIG. 6, the user locates at a position corresponding to the coordinate value "150" along a minus direction of the Y-axis (a dotted line direction on a screen 12 in FIG. 6).

Moreover, in an upright orientation information column, an upright direction from the viewpoint of the corresponding user is recorded as a vector expression according to the coordinate system on the screen of the image display unit 12. This upright orientation is used as a display direction at the time of displaying the information for the user.

In FIG. 1, the control unit 18 controls each part of the apparatus 10. Moreover, the control unit 18 analyzes a handwriting input and detects an input format as the format information of expression used in the handwriting input. The control unit 18 stores the language kind information and the input format information as a group. Therefore, by referring to the group of stored information, the control unit 18 can also control an output format of an output message to be the same as the input format of which the language kind is the same as that of the output message.

Figure 7:
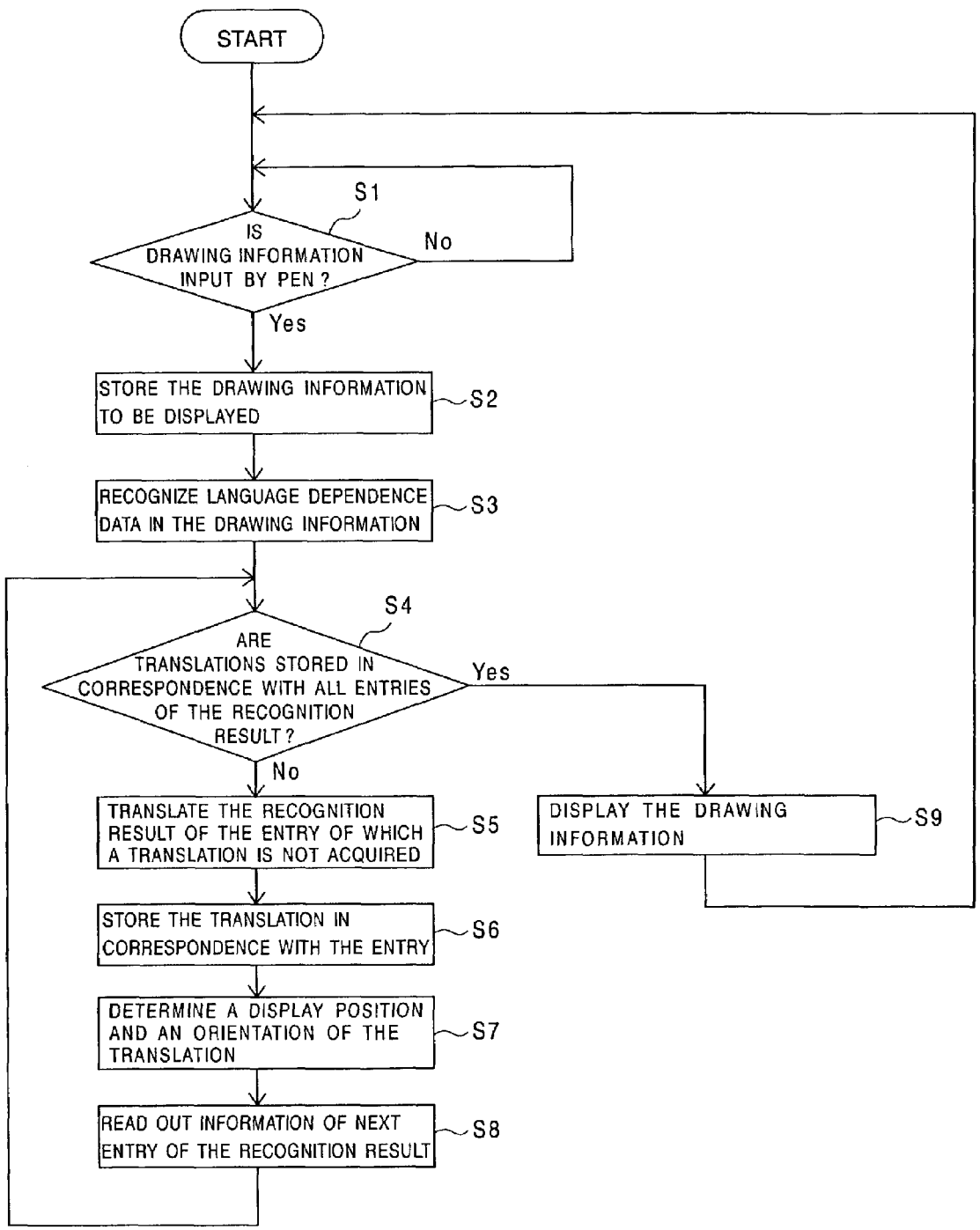
FIG. 7 is a flow chart for explaining operation of the first embodiment of the present invention.

Next, the operation of the first embodiment of the present invention is explained with reference to FIG. 7. FIG. 7 is a flow chart of processing steps executed by the control unit 18.

Here, it is assumed that the entry of each user is prepared in the location information memory 17. That is, information about the location and the orientation of the user based on the apparatus 10 is acquired by the above-mentioned method and previously recorded in the location information memory 17.

In step S1 of FIG. 7, the control unit 18 is under a standby state of pen input generating. When a user performs the handwriting input using the pen device 11, the magnetic sensor unit 13 detects the position and state of a nib by operation of the user's pen device 11, and outputs them to the control unit 18 as pen input information (drawing information).

Next, in step S2, the drawing information is stored as display information. That is, after receiving the pen input information, the control unit 18 outputs the drawing information to the character/symbol recognition unit 14.

In step S3, the character/symbol recognition unit 14 performs language symbol recognition processing for the drawing information, and outputs recognition result information to the control unit 18. After receiving the recognition result information from the character/symbol recognition unit 14, the control unit 18 prepares a new entry in the display information memory 16, classifies the recognition result information suitably, and records them in the display information memory 16 as shown in FIG. 2. In this case, a sign "−" is recorded in the column of the translation ID of the new entry.

In step S4, the control unit 18 retrieves each entry of the display information memory 16 by checking the kind information column and the translation ID information. In this case, the entry of which contents of the kind information is language (Japanese, English, etc.) or symbol (Japanese symbol, English symbol, etc.) dependent on the language is extracted from the entries each of which the translation ID is "−".

Hereafter, the control unit 18 repeats processing of step S5-S7 for all extracted entries. That is, the control unit 18 sends the recognition result information of the entry that its translation is not recorded to the language/symbol translation unit 15.

In step S5, the language/symbol translation unit 15 performs translation processing for the recognition result information, and acquires the translation result information Rs. The language/symbol translation unit 15 outputs the translation result information Rs to the control unit 18.

Next, in step S6, the control unit 18 prepares a new entry Et in the display information memory 16 and records the language kind of the translation of the translation result information Rs in the kind information column of Entry Et. Moreover, the control unit 18 records the translation itself of the translation result information Rs in the contents information column of Entry Et.

Next, in step S7, the control unit 18 acquires a value Pt of the location information and a value Vt of the upright orientation of a user who should receive the translation corresponding to the entry Ed by referring to the location information memory 17. The control unit 18 records the value Vt in the upright orientation column of the Entry Et. By referring to the contents of the display information memory 16, the control unit 18 searches (calculates) a position Lt not overlapped with positions of other entries and near the position of Entry Es, and records the position Lt in the position information column of Entry Et.

Next, in step S8, the control unit 18 reads out information of next entry of the recognition result and repeats processing of steps S4-S8. If each translation of all entries is recorded, the drawing information is displayed in next step S9. Namely, by referring to the contents of the display information memory 16, the control unit 18 outputs the contents of each entry to the image display unit 12 so that the contents are displayed at a position where the position information of each entry represents and along an upright direction which the orientation of each entry represents.

Next, a concrete example of usage of the first embodiment is explained with reference to the schematic diagram of FIGS. 8 and 9. Explanation of FIGS. 8 and 9 corresponds to FIG. 2.

Figures 8, 10A, 10B:
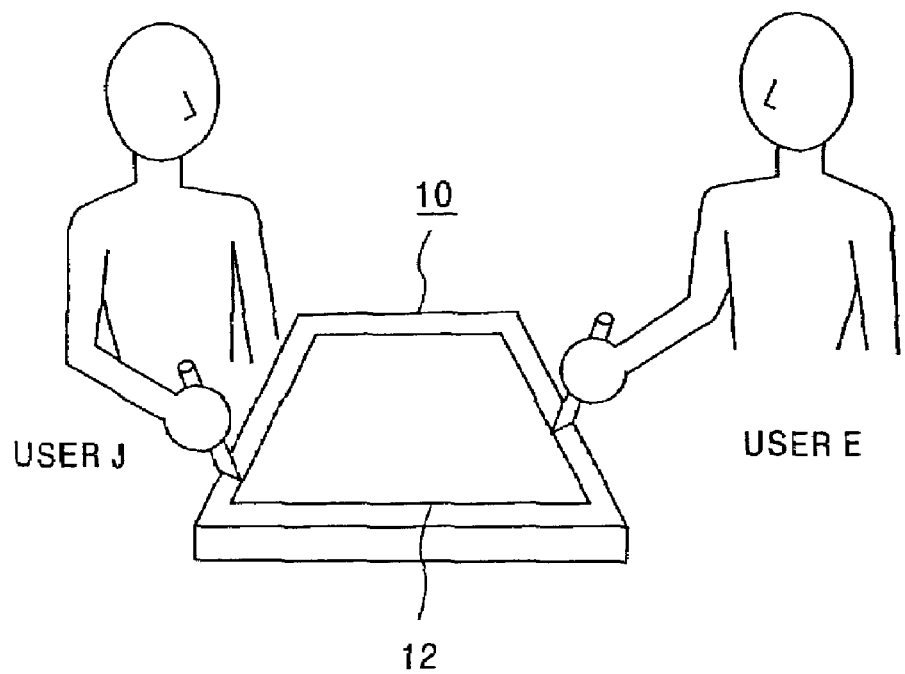
FIG. 8 is a schematic diagram for explaining a concrete example in the first embodiment of the present invention.
FIGS. 10A and 10B are schematic diagrams showing one example of the Japanese character and a symbol drawn on the display screen in an embodiment of the present invention.

In FIG. 8, it is assumed that the first user J who uses Japanese and the second user E who uses English face each other while the apparatus 10 is located between them. Each user mutually explains a place by drawing a map on a display screen 12 of the apparatus 10.

FIG. 9 shows transition of the screen of the image display unit 12 as the users communicate. Now, as shown in FIG. 9A, the user J inputs a drawing FIG. I1 showing a river by the pen device 11. In response to this input, processing of steps S1 and S2 of FIG. 7 is executed, and an entry of ID "I1" is generated in the display information memory 16. The kind of this entry I1 is a figure. The character/symbol recognition unit 14 recognizes that the handwriting input is neither a character nor a symbol. Therefore, in this case, the control unit 18 shifts processing from step S4 to step S9 in FIG. 7, and outputs only this figure drawn by the user as it is to the image display unit 12. In this way, a picture of the river is displayed on the screen of the image display unit 12.

Figure 9A:
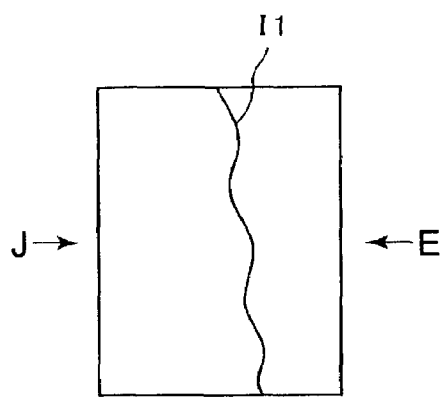
FIGS. 9A-9F is schematic diagrams showing transition of the display screen in the first embodiment of the present invention.
Figure 9B:
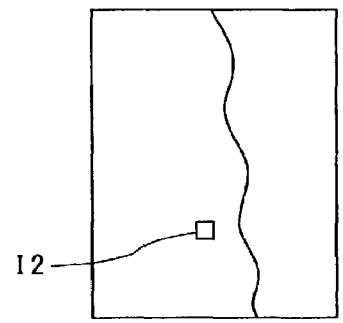

Next, user J inputs a drawing FIG. I2 showing a house. In this case, as shown in FIG. 9B, a new entry of I2 is generated in the display information memory 16, and the drawing FIG. I2 is additionally displayed on the screen of the image display unit 12 as it is shown.

Here, it is assumed that the user J inputs the Japanese character shown in FIG. 4 near the drawing figure showing a house. In this case, new entry of I3 is generated in the display information memory 16 by the control unit 18. The contents of the entry I3 is the language information which can be translated, and new entry I4 of "HOME" in English (as a translation of the contents of the entry I3) is generated in the display information memory 16 according to the recognition result of the character/symbol recognition unit 14. Moreover, the control unit 18 sets a display position of the entry I4 on the screen so that the display position is near the Japanese I3 and a location of the user E, not overlapped with display positions of other characters/symbols I1, I2, I3, and an orientation of the character I4 is upright orientation from the user E's view point (Steps S5-S8).

Figure 9C:
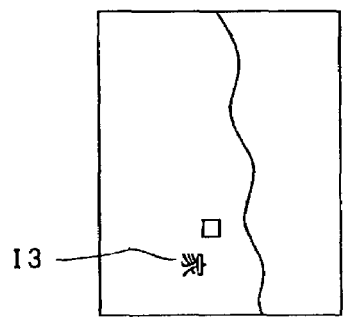
Figure 9D:
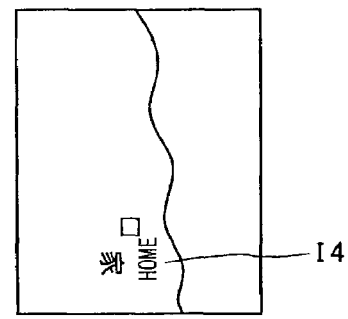
Figure 9E:
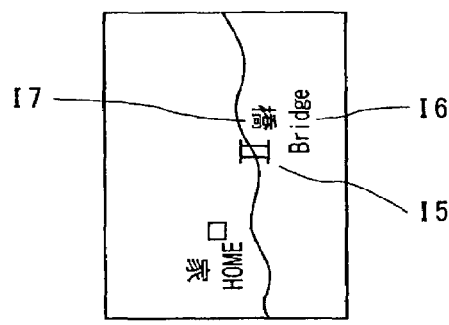

In step S9, based on a setup of the control unit 18, as shown in FIG. 9C, Japanese character of FIG. 4 inputted by the user J is displayed in addition to the previous contents of the screen. Furthermore, as shown in FIG. 9D, the English character string "HOME", which is a translation of Japanese character I3, is displayed near the Japanese character I3 along the upright orientation from the user E's view point. Subsequently, as shown in FIG. 9E, it is assumed that the user E inputs a drawing FIG. I5 showing a bridge and an English character string I6 "bridge" by handwriting. The above-mentioned processing is performed in the same way and a translation character string I7 in Japanese shown in FIG. 10A is displayed along the upright orientation from the user J's view point.

Figure 9F:
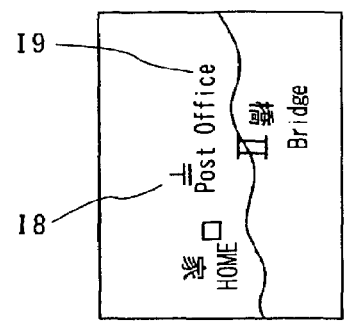

Next, it is assumed that the user J inputs a symbol of a post office I8 shown in FIG. 10B by handwriting. In this case, the character/symbol recognition unit 14 extracts a drawing pattern of handwriting as a symbol dependent on language culture. Furthermore, the language/symbol translation unit 15 obtains the translation result I9 as English character string "post office" for this symbol. The control unit 18 additionally displays this character string I9 as an annotation on the screen along the upright orientation from the user E's view point (FIG. 9F).

Thus, in the first embodiment, it is decided whether a user's handwriting message is a character or a symbol (generally referred to as language dependence data), and translation processing for a user of the other party is performed not only for a character but for a symbol. Furthermore, a translation result is presented as a message along the upright orientation from this user's viewpoint. Since a conversation by writing using not only a character but a symbol or a picture is adopted, even if the number of recorded expressions for communications (such as a fixed form phrase) is few, it is possible to provide improved information necessary for communication with a partner. The input by the handwriting of a character or a picture is possible, and input operation is very easy. That is, since complex translation processing with a picture, a symbol and a character is performed, communication using a picture (image) is extremely simplified and it is effective in explanation of a place, etc. Furthermore, a symbol which is not originally the object of translation can be translated as a character. As a result, the other user as a partner can easily understand a message from a user.

Furthermore, in the first embodiment, a presentation position and direction of a message are determined according to each user's location. Therefore, the translation result of the character/symbol written by a user and a partner can be simultaneously seen along the upright orientation for both the user and the partner, and communication can be effectively supported.

For example, it is assumed that a plurality of users commonly use one display screen, and each of the plurality of users performs a handwriting input using each pen device on the display screen. For example, the first user who speaks Japanese additionally writes an annotation in Japanese beside a certain figure drawn by the first user. The annotation is translated into English for the second user who speaks English, and the translated result is displayed side by side with the original annotation of Japanese. In this case, the translated annotation of English is displayed at a position physically near the second user on area neighboring the certain figure of the screen.

Moreover, it is assumed that the first user who speaks Japanese and the second user who speaks English face each other by locating a desk between them, and they use one display screen evenly put on the desk. When the first user additionally writes an annotation of Japanese beside a certain figure drawn by the first user, a translation result of English of the original annotation is displayed for the second user. In this case, the English annotation is displayed toward the upright orientation from the second user's viewpoint on area neighboring the certain figure of the screen.

Moreover, in the case that the input by handwriting is received from a user, for example, orientation of the input character/figure or drawing direction of input stroke is analyzed, and the spatial location of the user who inputted by handwriting is detected and stored. Based on this information, a presentation method of the message to present to each user is controlled, and the character information message is presented to the user. In this case, by referring to the location information of the user detected by above-mentioned processing, the message is displayed along the upright orientation from the user's viewpoint.

Moreover, in the case that the handwriting input is received from a user, the kind of input character is analyzed, and the language kind of the user is decided. The language kind information is utilized to control the output format for the user. For example, by analyzing the handwritten input from the first user, it is decided that a character in the input is Japanese and an upright orientation of character in the input is which direction on the screen. Next, the input in English from the second user is translated into Japanese and presented to the first user. In this case, a message of Japanese as a translation result of input (English) from the second user is displayed along the same direction as the upright orientation of the handwritten input (Japanese) from the first user decided by the above-mentioned processing.

Moreover, for example, information that the first user uses Japanese and the second user uses English may be stored. That is, when an input is received from a user, the user's language kind is decided by analyzing the input and stored in correspondence with spatial location of the user. In this way, the language kind can be utilized to control the presentation of a message afterwards.

In the first embodiment, the image display unit preparing a pen device and a magnetic sensor is commonly used as an input unit and a presentation unit. However, the same communication support is possible by sound using a microphone and a loudspeaker to input and output sound respectively.

Figure 11:
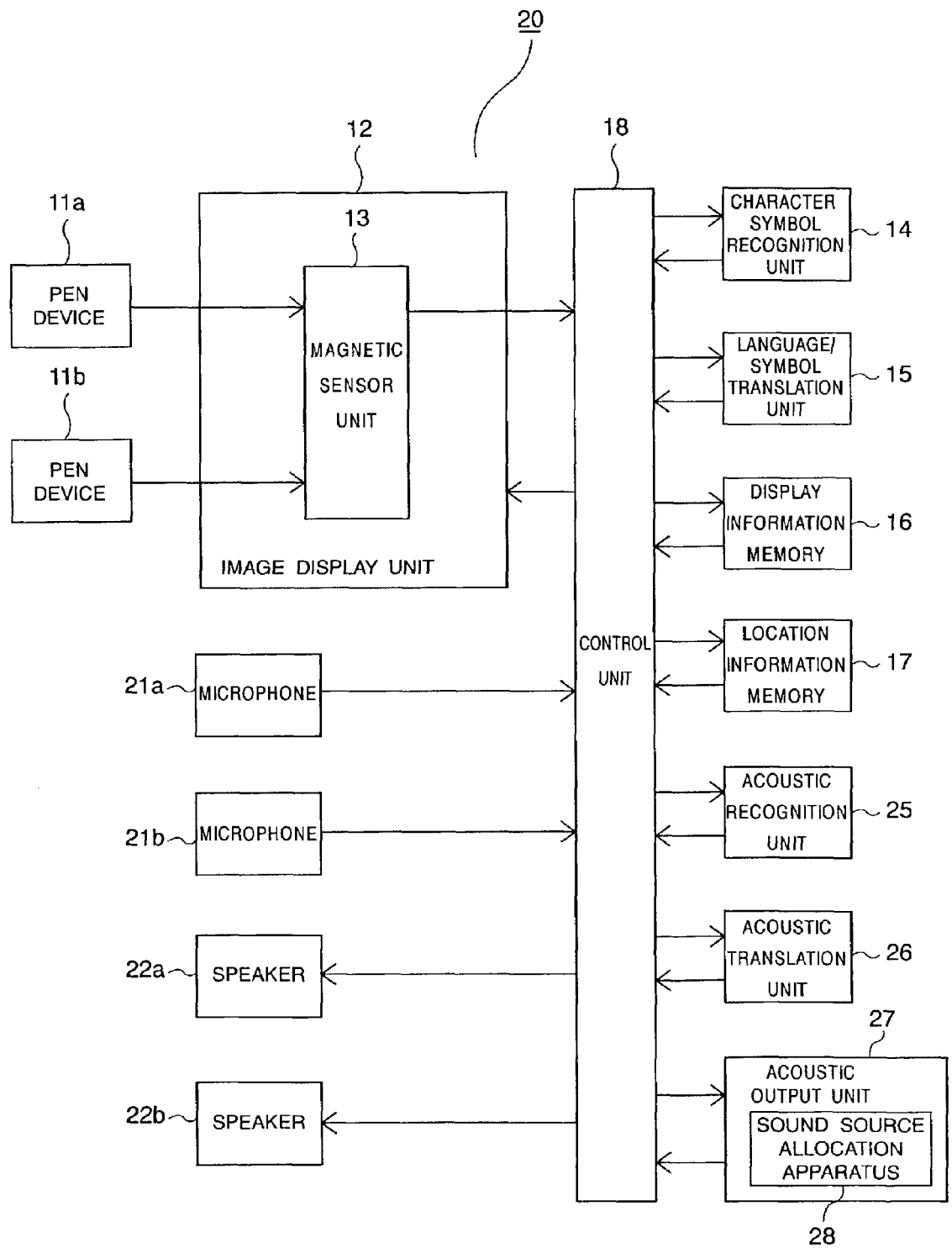
FIG. 11 is a block diagram showing the communication support apparatus according to the second embodiment of the present invention.

FIG. 11 is a block diagram of the communication support apparatus according to the second embodiment of the present invention, and this shows the apparatus capable of communicating support with sound. In FIG. 11, the same labels are given to the same components as FIG. 1, and explanation of the same components are omitted.

In addition to the components shown in FIG. 1, the communication support apparatus 20 of the second embodiment further includes microphones 21a and 21b, loudspeakers 22a and 22b, an acoustic recognition unit 25, an acoustic translation unit 26, and an acoustic output unit 27.

Figure 12:
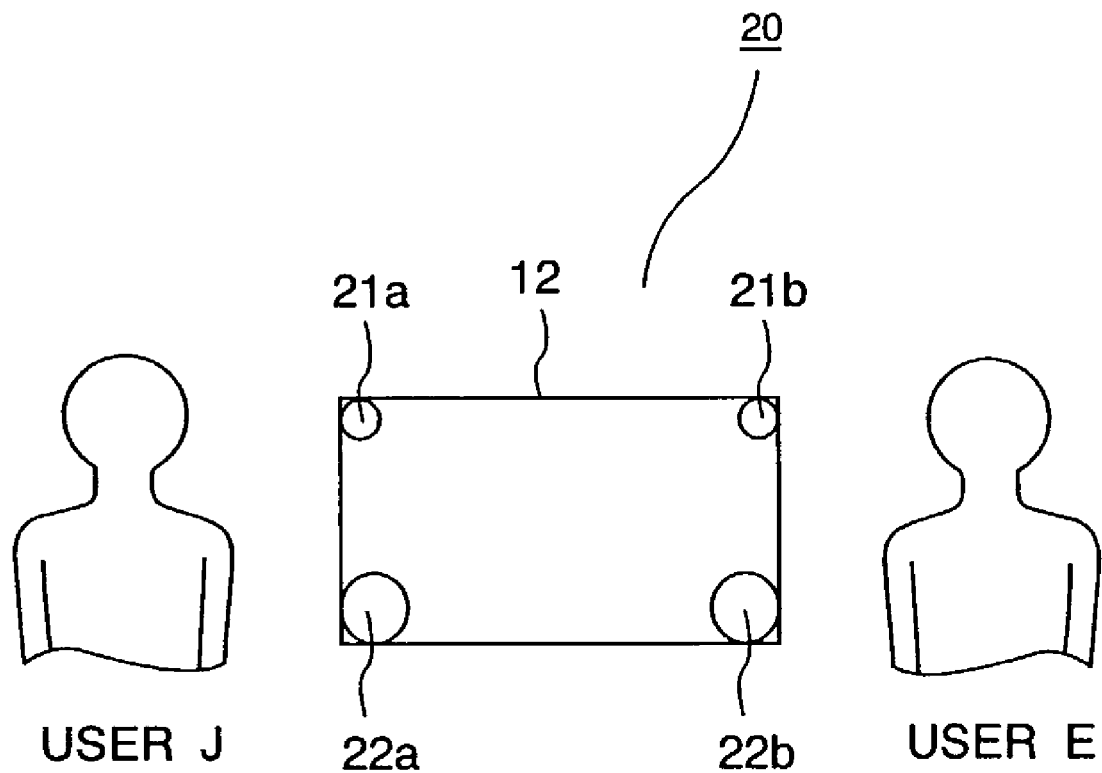
FIG. 12 is a block diagram for explaining actual arrangement of microphones 21a and 21b, and loud speakers 22a and 22b in FIG. 11 in an embodiment of the present invention.

FIG. 12 is a schematic diagram for explaining the example arrangement of microphones 21a and 21b and loudspeakers 22a and 22b. As shown in FIG. 12, a pair of microphones 21a and 21b is attached to both ends of one side of the image display unit 12, and a pair of loudspeakers 22a and 22b is attached to both ends of the other side of the image display unit 12.

The microphones 21a and 21b output a sound signal to the control unit 18. The microphones 21a and 21b are located a predetermined distance from each other. By a time delay relation of the sound signal from each microphones 21a and 21b, the control unit 18 can detect a location of the user who uttered the sound signal taken in by the microphones 21a and 21b.

The control section 18 gives the sound signal from the microphones 21a and 21b to the acoustic recognition unit 25. The acoustic recognition unit 25 recognizes the inputted sound signal, and returns a speech recognition result to the control unit 18. The control unit 18 outputs the speech recognition result to the acoustic translation unit 26. The acoustic translation unit 26 translates the speech recognition result, and returns a translation result to the control unit 18. The control unit 18 outputs the translation result from the acoustic translation unit 26 to the acoustic output unit 27.

The acoustic output unit 27 includes a sound source allocation apparatus 28. The acoustic output unit 27 converts the translation result into a sound signal. The sound source allocation apparatus 28 adjusts a level, a sound quality and a phase of the sound signal so that the sound signal of the translation result is allocated towards a user whom the sound signal is presented. In this way, the acoustic output unit 27 outputs an adjusted sound signal to each of the loudspeakers 22a and 22b.

In addition, the number of microphones and the number of loudspeakers are not limited to two. At least three microphones and at least three loudspeakers may also be prepared.

In addition, the control unit 18 may analyze the speech signal, and extract information about the voiceprint and utterance style acquired from the speech signal. From such extracted information, it is also possible to identify the user who uttered the sound related to the speech signed.

Thus, in the second embodiment, not only a handwriting input but a speech input can be applied. A language by this speech input is translated into another language that a partner can recognize. The system is then able to output the translated sound signal towards a location of the partner.

Moreover, if the control unit 18 gives the recognition result of a handwriting input to the acoustic translation unit 26, it is possible that a text by the handwriting input can be output as speech using a partner's language toward the partner. Conversely, if the control unit 18 gives the recognition result of a speech input to the language/symbol translation unit 15, it is possible that the speech input is converted to a text using a partner's language and output on a screen of the image display unit 12.

Thus, in the second embodiment, a speech uttered by a user is converted to a speech using a partner's understandable language, and the converted speech is output toward the partner's location. Accordingly, efficiency of communication remarkably improves.

For example, it is assumed the first user who speaks Japanese and the second user who speaks English respectively locate at the right side and the left side of one common display. In this case, the speech signal in Japanese to be output to the first user is controlled so that the volume becomes large on the right side as it is the first user's location. In the same way, the speech signal in English to be output to the second user is controlled so that the volume becomes large on the left side as it is the second user's location.

For example, a plurality of microphones is prepared. By using a time delay relation of the speech signal acquired from each microphone, spatial location from which each speech signal is outputted can be detected (this is commonly called the microphone array technique). In short, a spatial location relation between each user and the apparatus 20 can be detected. Based on the location information, it is possible that a character/picture message is displayed at a screen position near a user who should receive the message at an upright orientation from the user's view point. Moreover, it is possible that a message of speech is allocated or projected towards a location of a user who should receive the message.

Furthermore, after receiving a speech input from a user, by analyzing the speech input, the user who uttered the speech input is identified. By utilizing this information, a spatial location relation between each user and the apparatus 20 is analyzed and used for controlling output format for the user.

The present invention is not limited to the above-mentioned embodiments. For example, spatial position and spatial posture of a pen device can be analyzed by embedding a magnetic tag into the pen device used for a handwriting input and by analyzing the tag information by the magnetic sensor. In this way, it is also possible to detect the spatial location relation between this apparatus and a user.

Moreover, each user using this apparatus may put on a wireless tag to the body, and the wireless tag information can be read by an antenna with directivity and analyzed. In this way, it is also possible to detect the spatial location relation between this apparatus and a user.

Moreover, it is not always necessary that an input is made in real time from a user. The input may be provided through a medium or a network.

Moreover, a plurality of input means such as a handwriting input and a speech input may be simultaneously used together.

Moreover, for example, an input may be executed by a menu selection.

Moreover, the type of input means and the type of output means may be different. For example, the input can be executed by speech and the output can be executed by character image.

Moreover, the input means for each user may be different. For example, one user may input by speech and another user may input by handwriting.

Moreover, the output means for each user may be different. For example, an output can be executed by speech to one user and the output can be executed by character image to another user.

Moreover, in addition to a function to translate language, a media conversion function such as conversion from a sound signal to a character signal may be commonly used.

Moreover, an output may be executed to a plurality of users simultaneously.

Moreover, there may be a plurality of input means and output means.

Moreover, in the above-mentioned embodiments, one apparatus commonly used by a plurality of users is explained. However, a plurality of apparatuses for communicating with each other may be adopted in accordance with an alternative embodiment of the present invention.

Moreover, a decision result of language kind may be utilized for determining a translation direction from one language to another language.

Moreover, a decision result of an input user may be utilized for determining the translation direction as a language king of the input user.

Moreover, when this apparatus 10 (20) is realized as a portable equipment which a user can have by hand, by preparing a means for detecting a spatial posture of a main part, an output format may be controlled using the posture information together.

Moreover, in the above-mentioned embodiments, the orientation of the character is controlled on the screen. However, for example, translucent display, multicolor display, or stereoscopic display, may be adopted.

Moreover, language used by each user uses is not limited to one. A plurality of languages may be used by each user. The language which a user uses may be set up beforehand or the user may set the use language suitably.

Moreover, in a processing for detecting the location relation between each user and the apparatus, an antipersonnel sensor, an image recognition technique for a face or a hand, or a motion capture technique, may be used.

Moreover, in the case of controlling the output format of the speech signal, at a location of a user who should not receive the speech signal, the speech signal may become small or may be masked not to hear for the user.

As mentioned-above, in the present invention, smooth communication for a plurality of persons each using a different language is possible.

For embodiments of the present invention, the processing of the communication support apparatus of the present invention can be accomplished by computer-executable program, and this program can be realized in a computer-readable memory device.

In embodiments of the present invention, the memory device, such as a magnetic disk, a floppy disk, a hard disk, an optical disk (CD-ROM, CD-R, DVD, and so on), an optical magnetic disk (MD, and so on) can be used to store instructions for causing a processor or a computer to perform the processes described above.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device. The component of the device may be arbitrarily composed.

In embodiments of the present invention, the computer executes each processing stage of the embodiments according to the program stored in the memory device. The computer may be one apparatus such as a personal computer or a system in which a plurality of processing apparatuses are connected through the network. Furthermore, in the present invention, the computer is not limited to the personal computer. Those skilled in the art will appreciate that a computer includes a processing unit in an information processor, a micro computer, and so on. In short, the equipment and the apparatus that can execute the functions in embodiments of the present invention using the program are generally called the computer.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A communication support apparatus, comprising:
    an input unit configured to receive first and second drawing information, in respective first and second languages, from respective first and second users having respective first and second locations and respective first and second upright orientations relative to the display;
    a control unit configured to determine the second location and the second upright orientation of the second user from the second drawing information; and
    a conversion unit configured to convert the first drawing information from the first language to the second language;
    wherein the control unit presents the converted first drawing information, in the second language, on the display in a manner determined by the second location and the second upright orientation.

2. The communication support apparatus according to claim 1, wherein the drawing information is at least one of a character, a word, a text and a symbol.

3. The communication support apparatus according to claim 2, wherein said conversion unit extracts language dependence data from the drawing information based on the first language and translates the language dependence data into the second language.

4. The communication support apparatus according to claim 3, wherein said conversion unit translates a symbol information as the language dependence data based on the first language into a word information based on the second language.

5. The communication support apparatus according to claim 3, further comprising:
    a display information memory configured to store a display position, an orientation, a kind, and contents of the first drawing information in correspondence with a drawing information identifier, when the first drawing information, based on the first language, is received from said input unit.

6. The communication support apparatus according to claim 5, wherein,
    if the kind of the first drawing information stored in said display information memory is language dependence data, said control unit stores a translation result of the language dependence data as the contents in correspondence with a translation identifier and the drawing information identifier of the language dependence data in said display information memory.

7. The communication support apparatus according to claim 6, wherein said control unit stores a translation display position near the drawing information based on the first language, the translation display position not overlapping other drawing information as a position of the translation result in said display information memory.

8. The communication support apparatus according to claim 7, where said control unit retrieves the upright orientation of the second user to present the translation result from said location information memory, and stores the upright orientation of the second user as the orientation of the translation result in correspondence with the translation identifier in said display information memory.

9. The communication support apparatus according to claim 8, wherein said control unit displays the translation result on the display according to the position and the orientation of the translation result by referring to said display information memory.

10. The communication support apparatus according to claim 1, wherein said input unit receives the first and second drawing information, in handwritten form, from the first user and the second user.

11. The communication support apparatus according to claim 10,
wherein said control unit determines, from the first and second drawing information:
the first and second locations;
the first and second upright orientations;
kinds of the first and second drawing information, and the first and second languages.

12. The communication support apparatus according to claim 11, further comprising:
a location information memory configured to store the first and second locations and the first and second upright orientations.

13. The communication support apparatus according to claim 11, wherein said control unit analyzes the first drawing information based on the first language, detects an input format information used in the first drawing information, and stores the input format information in correspondence with the first language.

14. The communication support apparatus according to claim 13, wherein said control unit determines an output format of the information based on the second language by using the input format information corresponding to the second language.

15. The communication support apparatus according to claim 1, wherein said control unit detects the first location and the second location using at least one of a wireless tag and a magnetic tag.

16. A method for supporting communication, comprising:
inputting a drawing information for presentation on a display by each of a first user and a second user relative to the display;
deciding a location and an upright orientation of each of the first user and the second user relative to the display based on a feature of the drawing information inputted by each of the first user and the second user;
converting the drawing information based on a first language of the first user to an information based on a second language of the second user; and
presenting the information based on the second language on the display according to the location and the upright orientation of the second user relative to the display.

17. A computer program product, comprising:
a computer readable program code embodied in said product for causing a computer to support communication, said computer readable program code having:
a first program code to input a drawing information for presentation on a display by each of a first user and a second user relative to the display;
a second program code to decide a location and an upright orientation of each of the first user and the second user relative to the display based on a feature of the drawing information inputted by each of the first user and the second user;
a third program code to convert the drawing information based on a first language of the first user to an information based on a second language of the second user; and
a fourth program code to present the information based on the second language on the display according to the location and the upright orientation of the second user relative to the display.

* * * * *